United States Patent [19]

Tsumura

[11] Patent Number: 4,488,233

[45] Date of Patent: Dec. 11, 1984

[54] PATH INDICATING APPARATUS OF MOVING VEHICLE

[76] Inventor: Toshihiro Tsumura, 7-21, Abiko 3-Chome, Sumiyoshi-ku, Osaka-shi, Osaka-fu, Japan

[21] Appl. No.: 306,591

[22] Filed: Sep. 28, 1981

[30] Foreign Application Priority Data

Oct. 8, 1980 [JP] Japan .................. 55-141306

[51] Int. Cl.³ .................. G05D 1/00; G06F 15/20
[52] U.S. Cl. .................. 364/424; 364/456; 364/433; 244/185; 180/167; 172/4.5; 37/DIG. 20
[58] Field of Search .............. 364/434, 424, 436, 444, 364/456, 451, 433; 37/D19, D10; 180/167, 168, 169; 172/4.5; 244/185; 73/178 R, 178 T

[56] References Cited

U.S. PATENT DOCUMENTS

| | | | |
|---|---|---|---|
| 3,494,426 | 2/1970 | Studebaker | 172/4.5 |
| 3,813,171 | 5/1974 | Teach et al. | 172/4.5 X |
| 3,919,687 | 11/1975 | Gülich et al. | 73/178 T |
| 3,964,053 | 6/1976 | Heiser | 364/429 X |
| 4,049,961 | 9/1977 | Marcy | 250/202 |
| 4,273,196 | 6/1981 | Etsusaki et al. | 172/4.5 |
| 4,307,791 | 12/1981 | De Bruire | 364/424 X |
| 4,328,545 | 5/1982 | Halsall et al. | 364/424 |

Primary Examiner—Eddie P. Chan
Assistant Examiner—Ronni S. Malamud
Attorney, Agent, or Firm—Darby & Darby

[57] ABSTRACT

A path indicating apparatus for indicating a path so that a moving vehicle movable in the horizontal and vertical directions, such as an aircraft, may move along such a predetermined path. The predetermined path is defined as an intersecting line of two scanning planes which are formed by scanning signals having a narrow beam width in a horizontal plane and a vertical plane, respectively. The vehicle is provided with a plurality of detectors arranged in the horizontal and vertical directions for detecting the signals being scanned in the horizontal and vertical planes, respectively, so that the detectors arranged in the vertical and horizontal directions may detect deviation of the vehicle in the horizontal and vertical planes, respectively. The vehicle is responsive to the detected signals from the respective detectors to determine the moving direction to be taken by the vehicle so that the vehicle may move along the path and the vehicle is steered responsive to the determined direction outputs.

17 Claims, 32 Drawing Figures

|     | 501 | 502 | 503 | 504 | 505 |
|-----|-----|-----|-----|-----|-----|
| 511 | +2  | +1  | -2  | -4  | -6  |
| 512 | +3  | +1  | -1  | -3  | -5  |
| 513 | +4  | +2  | 0   | -2  | -4  |
| 514 | +5  | +3  | 1   | -1  | -3  |
| 515 | +6  | +4  | +2  | -1  | -2  |

711

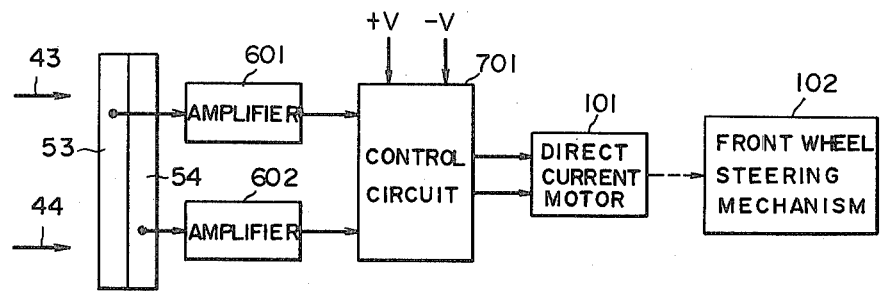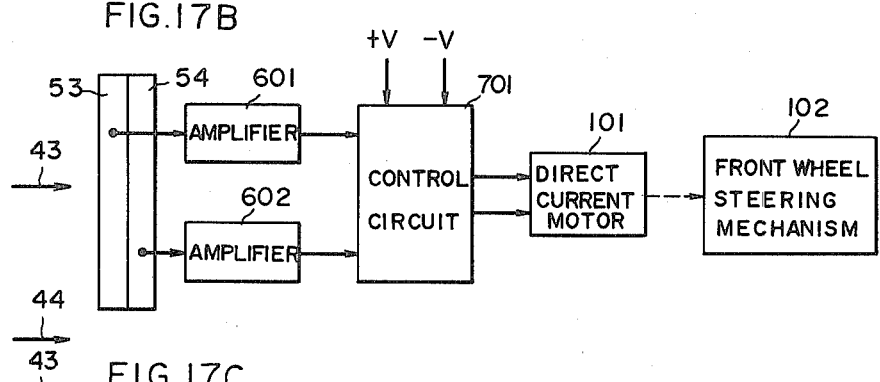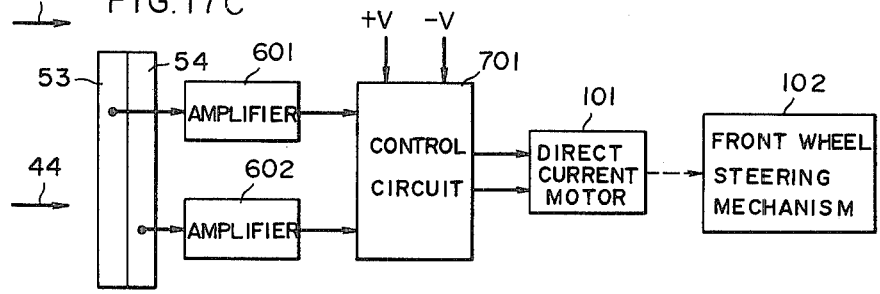

PATH INDICATING APPARATUS OF MOVING VEHICLE

BACKGROUND OF THE INVENTION

1. Field of the Invention

The present invention relates to a path indicating apparatus of a moving vehicle. More specifically, the present invention relates to an apparatus for generating a signal for indicating a path for movement therealong of a moving vehicle such as an automobile, terrain vehicle, aircraft and the like determined in association with an intersecting line defined by a first plane and a second plane.

2. Description of the Prior Art

It would be very convenient if a signal can be generated for indicating a predetermined path for movement therealong of a vehicle such as an automobile and the like. To that end, an approach has been proposed in which a metallic tape is adhered onto the ground along a movement path so that a moving vehicle may move along the path so as to trace the same by detecting the metallic tape by a detector. However, this approach involves tiresomeness and hence an inconvenience in that in order to change the movement path the metallic tape need be changed so that a desired new moving path may be obtained. Another inconvenience of such approach is that even if the same can be applied to a moving vehicle running on a flat plane such as on the ground the same cannot be applied to a vehicle moving in the horizontal and vertical directions, such as an aircraft, terrain vehicle and the like.

SUMMARY OF THE INVENTION

A movement path is determined in advance in association with an intersecting line determined by a first plane and a second plane intersecting the first plane. A scanning plane is formed by scanning a signal of a sharp directivity on at least one of the first and second planes. A moving vehicle is provided with a detecting means for detecting whether the moving vehicle is moving along a path defined by the first and second planes including the scanning plane on at least one of these two planes. According to the present invention, a moving direction of the path for movement therealong of a moving vehicle can be detected with accuracy and the same can be advantageously utilized in moving such moving vehicle.

In a preferred embodiment of the present invention, a laser beam is scanned to form a scanning plane so that the scanning plane intersects the plane of the road surface, whereby an intersecting line defined by the above described scanning plane and the road surface is used as a path for movement therealong of an automobile. On the other hand, an automobile is provided with a plurality of detectors arranged in the direction intersecting both the moving direction and the scanning plane. A determining means is provided for determining whether the automobile is steered rightward or leftward responsive to detection of the laser beam by any one of the plurality of detectors. A display means is provided to be responsive to a determination signal from the determining means for displaying the direction being steered in a visible or audible manner or more preferably a steering means is provided to be responsive to the determination signal from the determining means for steering the vehicle in the determined direction. Therefore, according to the embodiment an automobile can be made to move along a predetermined movement path with accuracy.

In a more preferred embodiment of the present invention, a further plurality of detectors are provided in the direction intersecting the path direction. The outputs from the plurality of detectors are utilized such that the output of the detector closer to the center is a less weighted direction indicating signal and the outputs from the detector further away from the center is a more weighted direction indicating signal. Thus, a given deviation at a relatively large distance from center is weighted a greater amount than for a similar deviation occurring closer to the center. The output signals are therefore weighted according to the proximity of their respective detectors from the center of the path. By making different the steering angle of the steering means depending on the weighted value of the direction indicating signal, a finer steering control can be made of a steering angle with respect to the path.

In a further preferred embodiment of the present invention, two sets of detectors are provided at the front end portion and the rear end portion, respectively, of the automobile, so that a deviation of the automobile at the front end portion and the rear end portion with respect to the path may be detected responsive to the detected signals from these detectors. Therefore, according to the embodiment, assuming that an automobile is moving with a given angle with respect to the path when the detector at the center out of the plurality of detectors at the front end portion or the rear end portion is detecting the laser beam, a deviation angle of the vehicle with respect to the path can be determined.

In a still further preferred embodiment of the present invention, laser beams are adapted to scan the horizontal plane and the vertical plane, respectively, so that a path of a vehicle such as an aircraft or terrain vehicle is defined as an intersecting line defined by the horizontal scanning plane and the vertical scanning plane. The aircraft is provided with detectors arranged in the vertical direction and the horizontal direction for detecting the respective laser beams in the horizontal plane and the vertical plane, respectively. A steering means is responsive to the detected signal from the detectors arranged in the horizontal direction for controlling a directional rudder of the aircraft, whereby the moving direction of the aircraft in the horizontal plane is controlled. The steering means is also responsive to the detected signal of the detectors arranged in the vertical direction for controlling an elevator of the aircraft, whereby the moving direction of the aircraft can be vertically controlled. Therefore, according to the embodiment, an aircraft can be made to move with accuracy along a predetermined path in association with an intersecting line determined by a horizontal scanning plane and a vertical scanning plane.

In still a further preferred embodiment of the present invention, laser beams are scanned along a predetermined path in association with an intersecting line determined by the horizontal plane and the vertical plane and a ground vehicle which moves vertically as well as horizontally, such as a bulldozer, is provided with detectors for detecting the respective laser beams. The rotational directions of the caterpillars of the bulldozer are controlled responsive to the detected signal of the laser beam being scanned in the vertical plane, while the angle in the vertical direction of a blade of the bulldozer is controlled responsive to the detected signal of the laser beam being scanned in the horizontal direction. As a result, an amount of soil carried by the blade can be changed and accordingly the moving direction of the bulldozer in the vertical direction can be controlled. Therefore, according to the embodiment, by scanning the laser beams in the horizontal direction and the vertical direction along a road being graded, a road can be graded by a bulldozer along a predetermined path to a predetermined depth or height.

Accordingly, a principal object of the present invention is to provide a path indicating apparatus of a vehicle so as to be capable of detecting a predetermined path for movement therealong of a moving vehicle such as an automobile determined in association with an intersecting line defined by a first plane and a second plane intersecting the first plane.

One aspect of the present invention resides in provision of a path indicating apparatus of a moving vehicle for generating a signal for indicating a predetermined path to a moving vehicle so that the moving vehicle may move along the path with a least deviation with respect to the path.

Another aspect of the present invention resides in provision of a path indicating apparatus of a moving vehicle for generating a signal for indicating a path to a vehicle so that the same may move along a path determined in association with an intersecting line defined by a first plane and a second plane intersecting the first plane.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 1A, 1B, and 1C are diagrams useful for explaining the principle of the present invention in which FIG. 1A is a front view as seen from a moving path of a moving vehicle, FIG. 1B is a plan view thereof and FIG. 1C is a side view thereof.

FIGS. 17A, 17B and 17C are block diagrams showing further embodiments of the present invention, showing a steering signal generating apparatus employing two scanning signals of different frequencies;

DESCRIPTION OF THE PREFERRED EMBODIMENTS

Figure 1A:
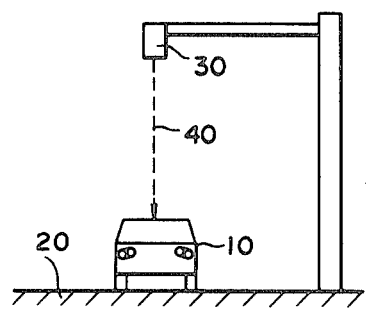
Figure 1B:
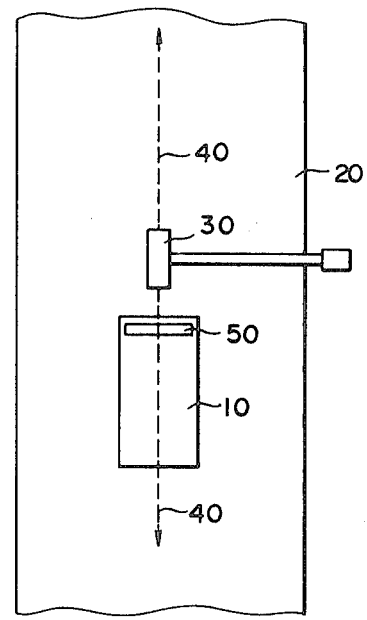
Figure 1C:
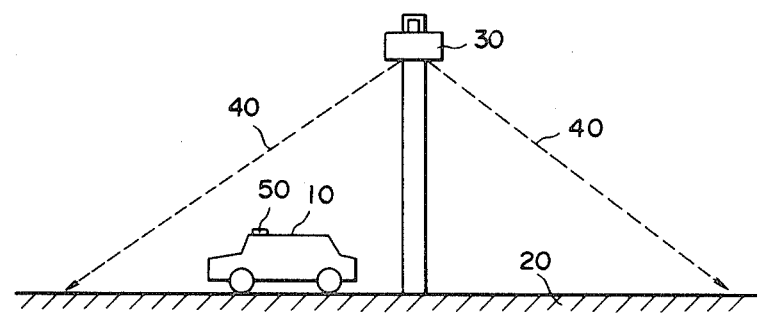

FIGS. 1A, 1B and 1C are views for explaining the principle of one embodiment of the present invention. Referring to FIGS. 1A, 1B and 1C, the embodiment is an example of an automobile running on a road 20 which is a fixed surface being referred to as a first plane. A laser beam 40 is scanned onto the road 20, whereby a scanning plane is formed which is referred as a second plane. An intersecting line of the scanning plane and the road 20 is defined as a moving path of the automobile 10. To that end, a laser beam generating apparatus 30 is provided at the fixed position above the road 20. The laser beam generating apparatus 30 is adapted to scan the laser beam 40 having a narrow beam width in the direction along a path where the automobile 10 is to be moved on the road 20, whereby the scanning plane is formed. More specifically, the laser beam generating apparatus 30 is adapted to scan the laser beam 40 in succession in the direction along the path on the road and in the sense in which the automobile 10 is to move.

On the other hand, the automobile 10 is provided at the top surface thereof with a detecting means 50 for detecting the laser beam 40. The detecting means 50 comprises solar batteries, for example, for detecting the laser beam 40. Since the present invention defines the intersecting line of the first and second planes as a path, it is necessary to determine the path upon detection of information concerning both surfaces. However, according to the embodiment shown, the first plane is the road 20 and the distance between the road 20 and the detector 50 of the automobile is substantially constant. Accordingly, the information concerning the height of the detector 50 with respect to the surface of the road 20 can be deemed as in advance given and therefore detection of only the laser beam 40 suffices to determine the path.

The automobile 10 is further provided with determining means, not shown. The determining means is responsive to the detected output signal of the detecting means 50 to determine a deviation of the automobile 10 with respect to the path defined by the scanning the laser beam 40, thereby to provide a signal representing determination of the direction for moving the automobile 10 based on the above described determination. The determining means is responsive to the determination signal to display a direction of the automobile 10 being moved by a display, not shown, to produce a sound from a sound producing means, not shown, to indicate the moving direction, to control a steering means, not shown, or the like. It is pointed out that the present invention can be applied not only to an automobile 10 but also applied to a forklift, a walking machine, a bicycle, a motorbike, ship and any other moving vehicle moving on a two-dimensional plane.

Figure 2A:
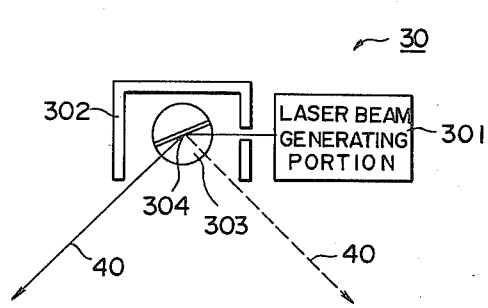
FIGS. 2A and 2B are views of a laser beam generating apparatus.
Figure 2B:
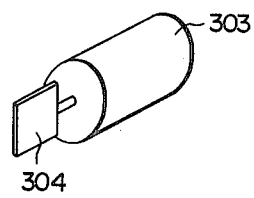

FIGS. 2A and 2B are views showing a laser beam generating apparatus for scanning a laser beam. First referring to FIG. 2A, a laser beam generating portion 301, comprises a semiconductor laser producing a laser beam having a narrow beam width. A housing 302 is provided contiguous to the laser beam generating portion 301. As shown in FIG. 2B, a reflecting mirror 304 and a motor 303 for rotating the reflecting mirror 304 are provided in the housing 302. Meanwhile, the laser beam generating portion 301 and the reflecting mirror 304 constitute a signal generating means. An aperture is formed on the surface of the housing 302 opposing the laser beam generating portion 301. A laser beam generated from the laser beam generating portion 301 is emitted through the aperture toward the reflecting mirror 304. Accordingly, as the reflecting mirror 304 is rotated as the motor 303 rotates, the laser beam is scanned on the moving path with an angle which in succession varies.

Meanwhile, the reflecting mirror 304 may be that which is rotated by a given angle. In the case where the moving speed of the moving vehicle 10 is relatively fast, the laser beam generating portion 301 may be structured such that the laser beam 40 may be scanned in the direction opposite to the moving direction of the moving vehicle 10. A prism, a multi-plane reflecting mirror or the like may be employed in place of the reflecting mirror 304. For example, by employing a reflecting mirror having six reflecting surfaces along the rotating circumferential direction, six laser beams are in succession scanned per each revolution of the mirror.

Meanwhile, the system may be structured such that positional information representing the position of installation of the laser beam generating apparatus 30 is generated from the laser beam generating apparatus 30 itself. To that end, a modulator may be provided between the laser beam generating portion 301 and the reflecting mirror 304, so that the laser beam may be modulated with the positional information by means of the modulator.

Figure 3:
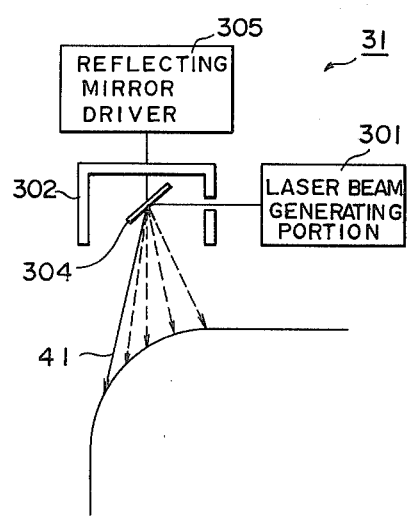
FIG. 3 is a view showing an apparatus for scanning a laser beam toward a curved path.
Figure 4:
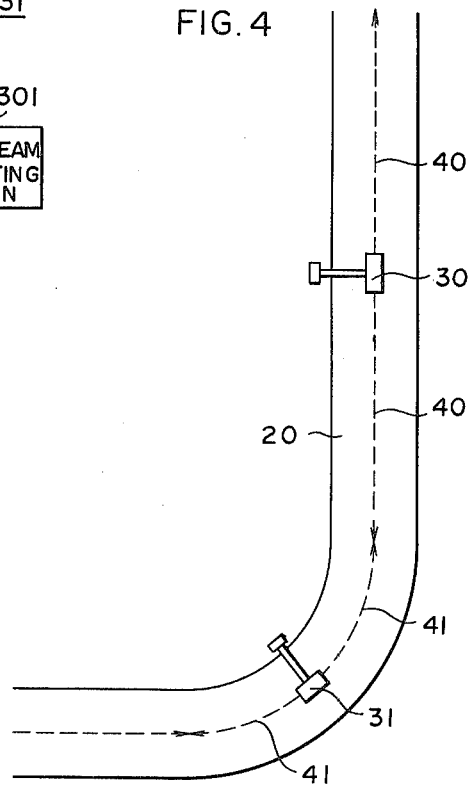
FIG. 4 is a plan view showing a state of a laser beam being scanned along a curved path.

FIG. 3 is a view showing a laser beam generating apparatus for scanning a laser beam along a curved moving path and FIG. 4 is a plan view showing a locus on the road scanned by the laser beam generated by the laser beam generating apparatus shown in FIGS. 2A and 3.

The laser beam generating apparatus 30 shown in FIG. 2A is aimed to scan a laser beam only along a straight line. On the other hand, the laser beam generating apparatus 31 shown in FIG. 3 is aimed to scan a laser beam 41 along a curved path. To that end, a reflecting mirror 304 is obliquely provided in the housing 302 with a given angle with respect to the horizontal direction and a vertical shaft is provided at the rear surface of the reflecting mirror 304. The vertical shaft is rotated by means of a reflecting mirror driver 305 by a given angle. Accordingly, the laser beam 41 generated from the laser beam generating portion 301 is reflected from the reflecting mirror 304, so that a locus of a curved line is drawn along the path. By providing such laser beam generating apparatus 31 as shown in FIG. 4 in the vicinity of a curved path, the laser beam 41 can be scanned along the curved path. On the other hand, by providing the laser beam generating apparatus 30 shown in FIG. 2A in the vicinity of a portion of a straight line path, the laser beam 40 generated from the laser beam generating apparatus 30 is scanned in a straight line. As a result, a path can be formed as a combination of a straight line path obtained by the laser beam 40 and a curved path obtained by the laser beam 41.

Figure 5:
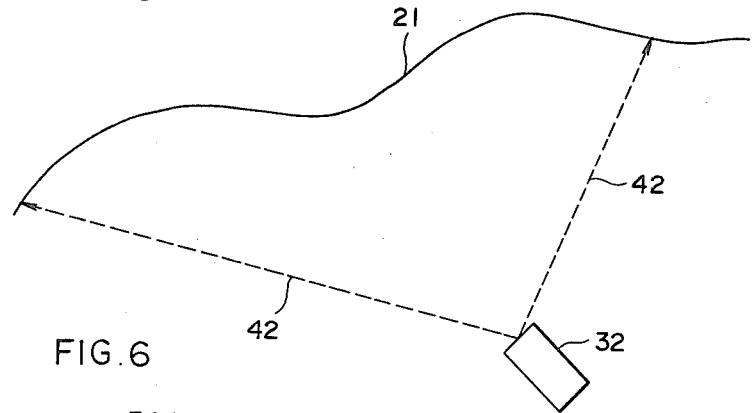
FIG. 5 is a view showing an example of a laser beam scanned along an arbitrary path.
Figure 6:
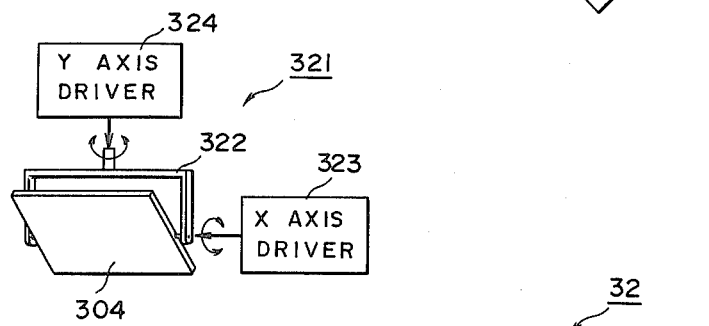
FIG. 6 is a view showing a driving mechanism of a reflecting mirror.
Figure 7:
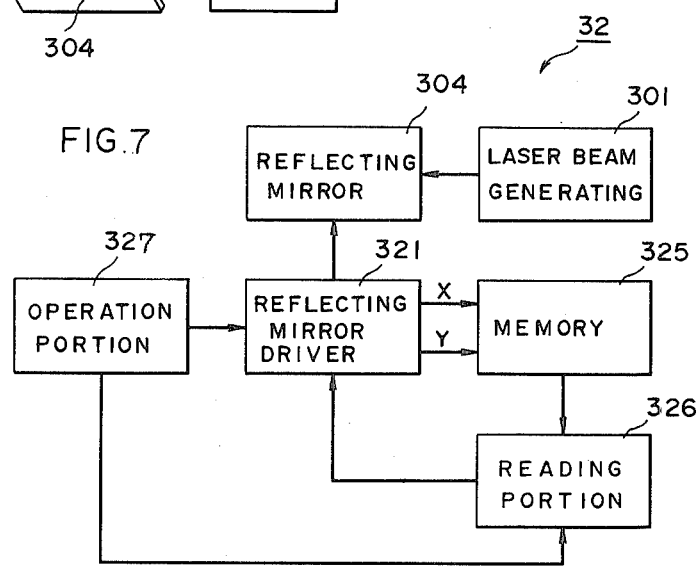
FIG. 7 is a block diagram of an apparatus for scanning a laser beam onto an arbitrary path.

FIG. 5 is a view showing an example of a locus obtained by scanning a laser beam along an arbitrary path, FIG. 6 is a view showing a driving mechanism of a reflecting mirror for scanning a laser beam along an arbitrary path shown in FIG. 5, and FIG. 7 is a block diagram of a laser beam generating apparatus for scanning a laser beam along an arbitrary path shown in FIG. 5. The laser beam generating apparatus 32 depicted in conjunction with FIGS. 5 to 7 is aimed to scan the laser beam 42 along a path 21 formed of a plurality of curves each having an arbitrary curvature. To that end, the laser beam generating apparatus 32 comprises a reflecting mirror driver 321 for rotatably driving a reflecting mirror 304 about an X axis and a Y axis. The reflecting mirror driver 321 comprises a supporting member 322, an X axis driver 323 and a Y axis driver 324. The supporting member 322 is aimed to rotatably support the reflecting mirror 304 about an X axis and a Y axis. The X axis of the reflecting mirror 304 is driven by the X axis driver 323 and the Y axis of the reflecting mirror 304 is driven by the Y axis driver 324. Referring to FIG. 7, a specific structure of the laser beam generating apparatus 32 will be described. An operation portion 327 is coupled to the above described reflecting mirror driver 321. The operating portion 327 is for performing a teaching operation for setting arbitrarily the angles of the X and Y axes of the reflecting mirror by driving the X axis driver 323 and the Y axis driver 324 included in the reflecting mirror driver 321 through manual operation. When the angles of the X and Y axes of the reflecting mirror 304 are set through the operation of the operation portion 327, the reflecting mirror driver 321 provides the respective set data concerning the X and Y axes to a memory 325. The memory 325 comprises a random-access memory, for example, so that the above described X axis data and the Y axis data are stored. The operation portion 327 comprises a selection switch, not shown, for selecting manual operation and an automatic operation and a signal selected by a selection switch is applied to a reading portion 326. The reading portion 326 is responsive to the selecting signal for reading the above described X axis data and the Y axis data from the memory 325, which are applied to the reflecting mirror driver 321.

Now referring to FIGS. 5, 6 and 7, an operation in the case where the laser beam 42 is scanned along an arbitrary path 21 will be described. First a curve is drawn along the path 21. By operating the operation portion 327, the reflecting mirror driver 321 is moved so that the laser beam 42 may impinge upon an arbitrary point on the path 21. The X axis data and the Y axis data at that time are stored in the memory 325. By repeating this operation, the reflecting mirror driver 321 is moved so that the laser beam may impinge upon a plurality of points along the path 21. Thus the X axis data and the Y axis data at the respective points are stored in the memory 325. After a teaching operation is performed with respect to a plurality of points along the path 21, the selecting switch is turned to an automatic operation. As a result, a plurality of pieces of information concerning the X axis data and the Y axis data is in succession read out from the memory 325 by means of the reading portion 326 and applied to the reflecting mirror driver 321. Then the reflecting mirror driver 321 is responsive to the X axis data and the Y axis data applied in succession to drive the X axis driver 323 and the Y axis driver 324. As a result, the reflecting mirror 304 scans in succession the laser beam generated from the laser beam generator 301 along the path 21.

Meanwhile, the laser beam generating apparatuses 30, 31 and 32 shown in FIGS. 2A, 3 and 7 were adapted to scan the laser beams 40, 41 and 42, respectively, along the path. However, the present invention is not limited to such embodiment and instead such apparatuses may be adapted to scan an ultrasonic wave, a light beam, or the like.

The FIG. 6 reflecting mirror driver was adapted to scan the laser beam 42 along an arbitrary path by rotating the supporting member 322 about the X axis and the Y axis. However, alternatively the laser beam 42 can be scanned on an arbitrary path by providing the rotating shaft of a motor on the rear surface of the reflecting mirror 304 shown in FIG. 3 and by providing the axis of the motor so as to be inclined to an arbitrary angle. If desired, the reflecting mirror driver 321 may be replaced by a commercially available laser reflector.

Figure 8:
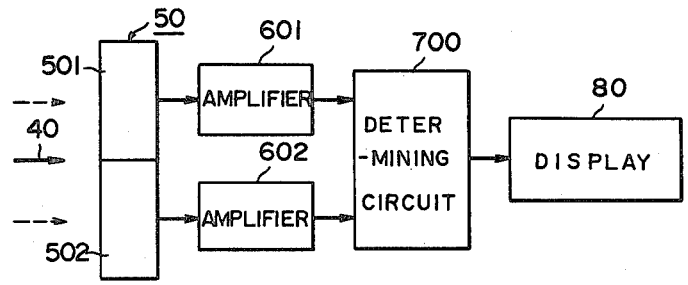
FIG. 8 is a block diagram of one embodiment of the present invention, wherein a path indication is made using sound.

FIG. 8 is a block diagram of a path indicating apparatus borne on the automobile 10. Referring to FIG. 8, the detecting means 50 is aimed to detect the laser beams 40, 41 and 42 generated and scanned from the laser beam generating apparatuses 30, 31 and 32 shown in FIGS. 2A, 3 and 5, respectively, and each may comprise two detectors 501 and 502. These detectors 501 and 502 are provided on the automobile 10 and arranged in the direction orthogonal to the moving direction of the automobile 10. For example, the detector 501 is provided at the right side of the automobile 10 and the detector 502 is provided at the left side of the automobile 10. The detected signals obtained from these detectors 501 and 502 are amplified by amplifiers 601 and 602, respectively. The output signals from the amplifiers 601 and 602 are applied to a determining circuit 700. The determining circuit 700 is responsive to the detected signals amplified by the amplifiers 601 and 602 to provide a determination signal representing whether the automobile 10 is to be steered leftward or to be steered rightward. More specifically, a rightward steering signal is generated upon detection of the laser beam 40 by the right side detector 501 and a leftward steering signal is generated upon detection of the laser beam 40 by the left side detector 502. When the laser beam 40 is scanned along a boundary portion between the detectors 501 and 502, neither leftward nor rightward steering signal is provided from the determining circuit 700.

The determining signal of the determining circuit 700 is applied to a display 80. The display 80 comprises display lamps for displaying that the automobile is to be steered leftward or rightward and is responsive to the determining signal of the determining circuit 700 to light either display lamp. The display 80 may be of a type adapted for displaying by characters whether the automobile is to be steered rightward or leftward. A driver of the automobile 10 steers a handle, not shown, rightward or leftward through a look at an indication by the display 80.

Figure 9:
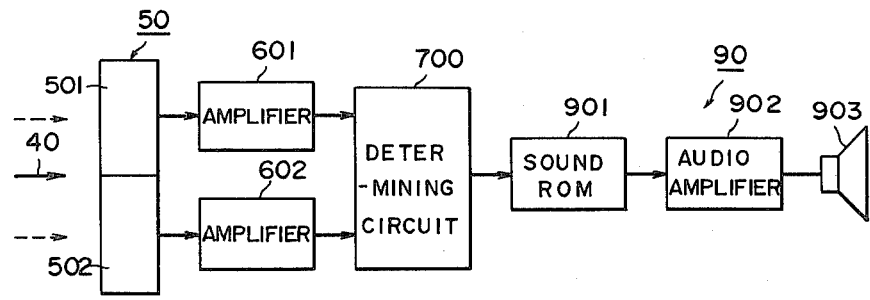
FIG. 9 is a block diagram of another embodiment of the present invention.

FIG. 9 is a block diagram of another embodiment of the present invention. The FIG. 9 embodiment is adapted to produce a sound representing information whether the automobile is to be steered leftward or rightward in response to the determining signal of the determining circuit 700. To that end, a sound producing means 90 is provided in the automobile 10. The sound producing means 90 comprises a sound read-only memory 901, an audio amplifier 902 and a speaker 903. The sound read-only memory 901 stores in advance sound data necessary for producing a sound representing whether the automobile is to be steered left or right in response to the determining signal of the determining circuit 700. The sound read-only memory 901 is responsive to the determining signal of the determining circuit 700 to provide corresponding sound information to the audio amplifier 902. The audio amplifier 902 amplifies the sound information and the output is applied to a speaker 903. Therefore, according to the embodiment in discussion a driver can learn by sound the information whether the automobile is to be steered left or right.

Figure 10:
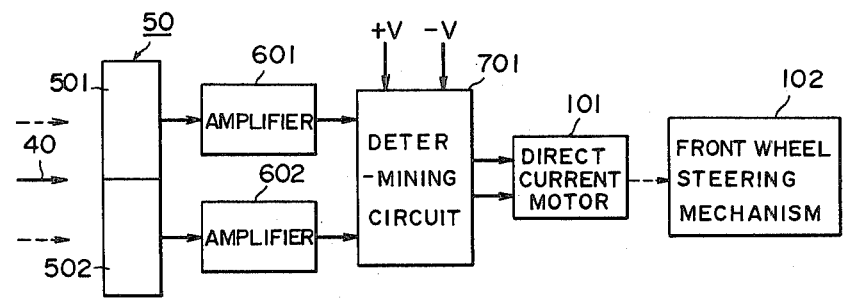
FIG. 10 is a block diagram of a further embodiment showing a steering signal generating apparatus for generating a steering signal for automatically steering an automobile based on a path indication signal.

FIG. 10 is a block diagram showing another embodiment of the present invention. The FIG. 10 embodiment is adapted to automatically steer the automobile in response to the determining signal of the determining circuit 701. To that end, a direct current motor 101 is coupled to the determining circuit 701. The direct current motor 101 is adapted to steer the front wheels leftward or rightward by driving a front wheel steering mechanism 102 of the automobile 10. More specifically, the front wheel steering mechanism 102 is aimed to steer the front wheels leftward or rightward by operating a handle in a conventionally known manner. In the embodiment shown, the direct current motor 101 is employed instead of the conventional handle for steering the front wheels. The determining circuit 701 is supplied with direct current voltages $+V$ and $-V$, respectively. The determining circuit 701 is responsive to the detected signals of the detectors 501 and 502 applied through the amplifiers 601 and 602 to select the polarity of a direct current voltage being applied to the direct current motor 101. As a result, the rotational direction of the direct current motor 101 is selected, whereby the front wheels of the automobile 10 are steered leftward or rightward by the front wheel steering mechanism 102. The determining circuit 701 is adapted not to supply the direct current voltage to the direct current motor 101 when the laser beam 40 is scanned in the boundary portion between the detectors 501 and 502. More specifically, when the laser beam 40 is scanned in the boundary portion between the detectors 501 and 502, this means that the automobile 10 is running correctly along the path. Therefore, the front wheel steering mechanism 102 serves not to steer the front wheels of the automobile 10 leftward or rightward. Therefore, according to the embodiment shown the automobile 10 is automatically steered so that a deviation from the path may be minimized in response to the determining signal of the determining circuit 701.

Figure 11:
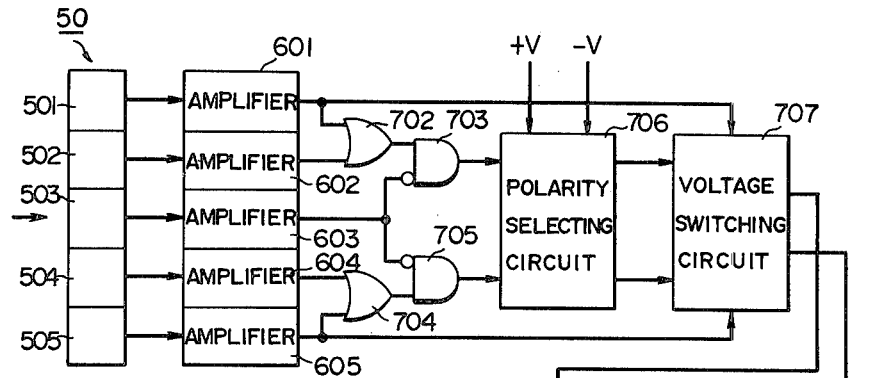
FIG. 11 is a block diagram of still a further embodiment of the present invention showing a steering signal generating apparatus comprising a plurality of detecting means provided on an automobile.

FIG. 11 is a block diagram showing a further embodiment of the present invention. The FIG. 11 embodiment is aimed to make the automobile 10 run more accurately along the path by increasing the number of the detecting means 50 being provided on the automobile 10. More specifically, the detecting means 50 comprises say five detectors 501 to 505. The central detector 503 is disposed approximately at the center of the automobile 10 and the detectors 501 and 502 are disposed at the right side of the automobile 10 while the detectors 504 and 505 are disposed at the left side of the automobile 10. The detected output signals from these detectors 501 to 505 are applied to the amplifiers 601 to 605 to be amplified to a predetermined level. The output signals from the amplifiers 601 and 602 are applied to one input of an AND gate 703 through an OR gate 702. The other input of the AND gate 703 is connected to receive the output signal of the amplifier 603.

The output signals of the amplifiers 604 and 605 are applied to one input of an AND gate 705 through an OR gate 704. The other input of the AND gate 705 is connected to receive the output signal of the above described amplifier 603. The outputs form the above described AND gates 703 and 705 are applied to a polarity selecting circuit 706. These AND gates 703 and 705 are aimed to inhibit the outputs of the OR gates 702 and 704 from being applied to the polarity selecting circuit 706 when the laser beam 40 is detected by the central detector 503. The polarity selecting circuit 706 is supplied with the direct current voltages $+V$ and $-V$. The polarity selecting circuit 706 is responsive to the output signals from the AND gates 703 and 705 to select the polarity of the direct current voltage. The direct current voltage of the polarity selected by the polarity selecting circuit 706 is applied to a voltage switching circuit 707. The voltage switching circuit 707 is supplied with the respective output signals of the above described amplifiers 601 and 605. When the voltage switching circuit 707 is supplied with the output signals from the amplifiers 601 and 605, the magnitude of the direct current voltage being applied to the direct current motor 101 is switched. More specifically, when the voltage switching circuit 707 is supplied with the output signals from the amplifiers 601 and 605, a relatively large voltage is obtained and applied to the direct current motor 101.

Now an operation will be described. When the automobile 10 is moving accurately along the path defined by the laser beam 40 scanned, the central detector 503 detects the laser beam 40. The detected output signal from the detector 503 is amplified by the amplifier 603 and the high level output signal is applied to the AND gates 703 and 705. Accordingly, the AND gates 703 and 705 provide the low level signal to the polarity selecting circuit 706. When the polarity selecting circuit 706 is supplied with the low level signal from the AND gates 703 and 705, no direct current voltage is provided. Accordingly, no direct current voltage is applied to the direct current motor 101 by the voltage switching circuit 707. Therefore, the front wheel steering mechanism 102 maintains a steering angle so far established by the front wheels of the automobile 10.

However, when the automobile 10 comes to deviate leftward, for example, from the path, it follows that the laser beam 40 scans the detector 502, for example. Therefore, the laser beam 40 is detected by the detector 502. Then the detected signal from the detector 502 is applied to the amplifier 602. The amplifier 602 amplifies the detected output signal to provide the high level signal. Since the central detector 503 has not detected the laser beam 40, the AND gates 703 and 705 have been enabled. Accordingly, the high level signal obtained from the amplifier 602 is applied through the OR gate 702 and the AND gate 703 to the polarity selecting circuit 706. Accordingly, the polarity selecting circuit 706 selects the polarity of the direct current voltage for the purpose of steering the automobile 10. The direct current voltage of the polarity as selected is applied to the voltage switching circuit 707. Since the voltage switching circuit 707 has not been supplied with the output signal from the amplifier 601 at that time, a relatively low direct current voltage is applied to the direct current motor 101. The direct current motor 101 is energized with the applied direct current voltage, whereby the front wheel steering mechanism 102 is driven. The front wheel steering mechanism 102 steers the front wheels of the automobile 10 rightward as per rotation of the direct current motor 101.

If the automobile 10 deviates rightward from the path, the laser beam 40 scans the detector 504, for example. Then the laser beam 40 is detected by the detector 504 and the detected signal is amplified by the amplifier 604 to provide the high level output signal. The high level output signal obtained from the amplifier 604 is applied through the OR gate 704 and the AND gate 705 to the polarity selecting circuit 607. Accordingly, the polarity selecting circuit 706 selects the polarity of the direct current voltage and the polarity selected direct current voltage is applied to the voltage switching circuit 707. Since the voltage switching circuit 707 has not been supplied with the output signal from the amplifier 605 at that time, a relatively low voltage is applied to the direct current motor 101. The direct current motor 101 is rotated in an opposite direction, whereby the front wheel steering mechanism 102 is driven in the opposite direction. Therefore, the front wheel steering mechanism 102 steers the front wheels of the automobile 10 leftward.

When the automobile 10 largely deviates rightward or leftward from the path, the laser beam 40 is detected by the detector 501 or 505. If and when the laser beam 40 is detected by the detector 501, for example, the detected output signal from the amplifier 601 is applied to the voltage switching circuit 707. At that time the polarity switching circuit 706 has been supplied with the detected output signals through the OR gate 702 and the AND gate 703. Accordingly, the polarity selecting circuit 706 selects the polarity of the direct current voltage so as to steer the automobile 10 leftward and the polarity selected direct current voltage is applied to the voltage switching circuit 707. Since the voltage switching circuit 707 has been supplied with the output signal from the amplifier 601, a relatively large direct current voltage is applied to the direct current motor 101. The direct current motor 101 increases the rotation speed in accordance with the relatively large direct current voltage. Therefore, the front wheel steering mechanism 102 steers the front wheels with an angle larger than that when the laser beam 40 is detected by the detector 502. More specifically, when the laser beam 40 is detected by the detector 501 or 505, the front wheel mechanism 102 steers the front wheels leftward or rightward more than when the laser beam 40 is detected by the detector 502 or 504.

Meanwhile, the FIG. 11 embodiment may also be adapted such that visual display is made of leftward steering or rightward steering or sound production is made to represent the same response to the output signals of the AND gates 703 and 705 and the output signals of the amplifiers 601 and 605.

Figure 12:
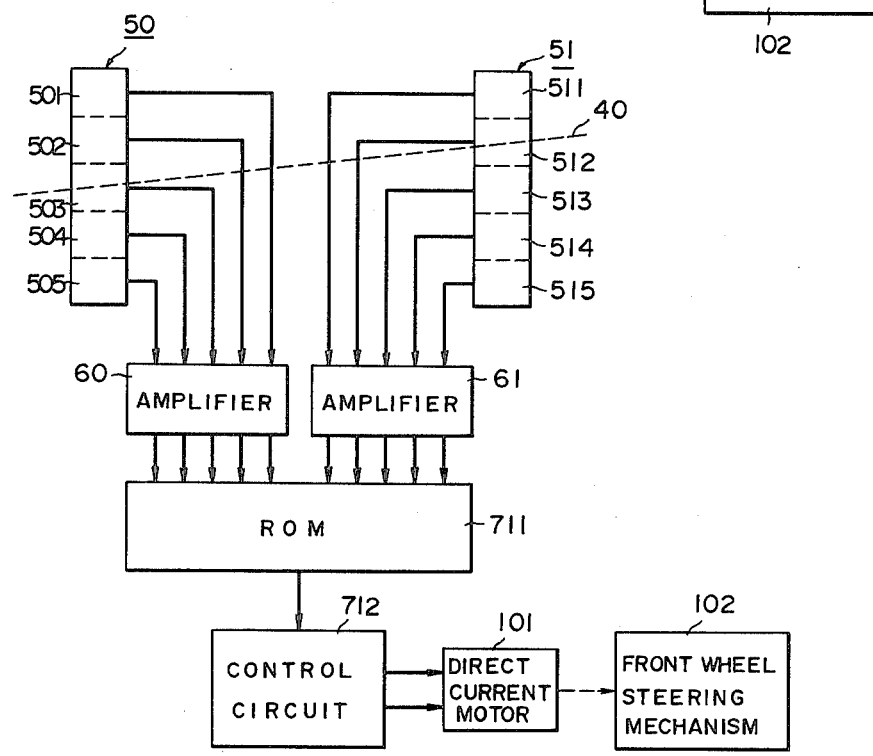
FIG. 12 shows a steering signal generating apparatus comprising detecting means provided in front and rear portions of an automobile.

FIG. 12 is a block diagram showing a further embodiment of the present invention. The FIG. 12 embodiment comprises detecting means 50 and 51 both at the front portion and the rear portion of the automobile 10 so that the automobile 10 may be moved more accurately along the path. More specifically, in the case of the previously described FIG. 11 embodiment a situation could be considered where the automobile 10 is moving with a given angle with respect to the path even if the laser beam 40 has been detected by the central detector 503. In such a case the automobile 10 could move further away from the path, since the automobile 10 is not steered left or right with the FIG. 11 embodiment. In order to eliminate such an inconvenience, therefore, the FIG. 12 embodiment comprises the detecting means 50 and 51 at the front and rear portions of the automobile 10. The detecting means 50 at the front portion of the automobile 10 comprises five detectors 501 to 505 as in the case of the FIG. 11 embodiment. The detecting means 51 at the rear portion also comprises five detectors 511 to 515 as similar to the previously described detecting means 50. The detected output signals of the detecting means 50 and 51 are individually amplified by means of the amplifiers 60 and 61, respectively. The respective output signals of the amplifiers 60 and 61 are applied to the read-only memory 711 as an address signal.

Figures 13, 14:
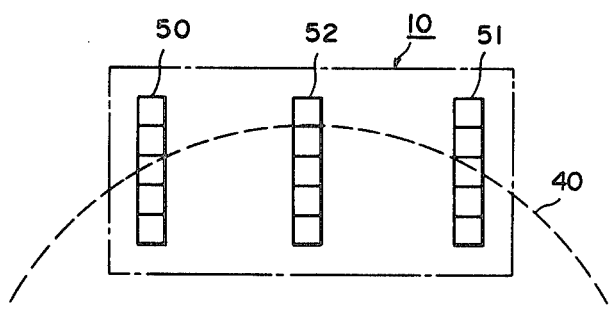
FIG. 13 is a view showing data being stored in a read only memory included in the FIG. 12 diagram.
FIG. 14 is a diagram showing an example in which detecting means are provided in front, center and rear portions of an automobile.

FIG. 13 is a table showing the data stored in the read only memory 711 included in the FIG. 12 diagram. Referring to FIG. 13, the read only memory 711 is adapted to store the data differently weighted corresponding to the detected signals of the detectors 501 to 505 and 511 to 515. More specifically, referring to FIG. 13, column addresses 501 to 505 correspond to the detectors 501 to 505, respectively, and low addresses 511 to 515 correspond to the detectors 511 to 515, respectively. The read only memory 711 stores the data differently weighted in the respective addresses. The plus symbol preceding the weighted data represents that the vehicle 10 is to be steered rightward and the minus symbol preceding the weighted data representing that the vehicle 10 is to be steered leftward. The value of the weighted data represents the magnitude of the direct current voltage being applied to the direct current motor 101. The read only memory 711 provides the weighted data from the corresponding address to the control circuit 712 when the detected signals are obtained from any of the detectors 501 to 505 and 511 to 515 through the amplifiers 60 and 61.

The control circuit 712 comprises the polarity selecting circuit 706 and the voltage switching circuit 707 shown in FIG. 11. The control circuit 712 is responsive to the weighted data obtained from the read-only memory 711 to select the polarity of the direct current voltage and to provide the direct current voltage of the magnitude corresponding to the weighted data to the direct current motor 101.

Now an operation of the embodiment will be described. In the case where the automobile 10 is moving correctly along the path defined by the scanning laser beam 40, the detectors 503 and 513 detect the laser beam 40. The respective detected signals from the detectors 503 and 513 are amplified by the amplifiers 60 and 61, respectively. The output signals of the amplifiers 60 and 61 address the read only memory 611. More specifically, the read-only memory 711 is responsive to the detected signals from the detectors 503 and 513 to provide the weighted data "0". When the control circuit 712 is supplied with the weighted data "0", no direct current voltage is supplied to the direct current motor 101. Now let it be assumed that, as shown in FIG. 12, the automobile 10 has been moving with a given angle with respect to the path and the detectors 503 and 512 detect the laser beam 40. Then the read-only memory 711 is responsive to the detected signals from the detectors 503 and 512 to provide the weighted data "−1". As a result, the control circuit 712 is responsive to the weighted data "−1" to select the corresponding polarity of the direct current voltage and provides the direct current voltage of the magnitude corresponding to the weighted data "−1" to the direct current motor 101. The direct current motor 101 drives the front wheel steering mechanism 102 as a function of the above described the direct current voltage. Accordingly, the front wheel steering mechanism 102 steers slightly leftward the front wheel of the automobile 10.

Conversely, let it be assumed that the automobile 10 has been moving with a given angle to the right side with respect to the path and the detectors 502 and 514 detect the laser beam 40. Then the read-only memory 711 is responsive to the respective detected signals of the detectors 502 and 514, thereby to provide the weighted data "+3". Accordingly, the control circuit 712 selects the corresponding polarity of the direct current voltage and provides the direct current voltage of a relatively large value corresponding to the weighted data "+3" to the direct current motor 101. Therefore, the front wheel steering mechanism 102 steers leftward the front wheels of the automobile 10 with a relatively large angle. Now let it be assumed that the automobile 10 has been moving in parallel with the path with the automobile 10 slightly shifted off the path and the detectors 501 and 511 detect the laser beam 40. Then the read-only memory 711 is responsive to the detected output signals of the detectors 501 and 511 to provide the weighted data "+2". The control circuit 712 provides the direct current voltage of the polarity and the magnitude corresponding to the weighted data to the direct current motor 101. More specifically, when the read-only memory 711 is supplied with a signal other than the detected output signals of the detectors 503 and 513, the read-only memory 711 provides a weighted data corresponding to the respective detected signals of the detecting means 50 at the front portion and the detecting means 51 at the rear portion. By thus providing the detecting means 50 and 51 at the front and rear portions of the automobile 10 and by providing the weighted data corresponding to the respective detected signals, the front wheels of the automobile 10 are steered as a function of the weighted data and the automobile 10 can be moved more accurately along the path.

Figure 15:
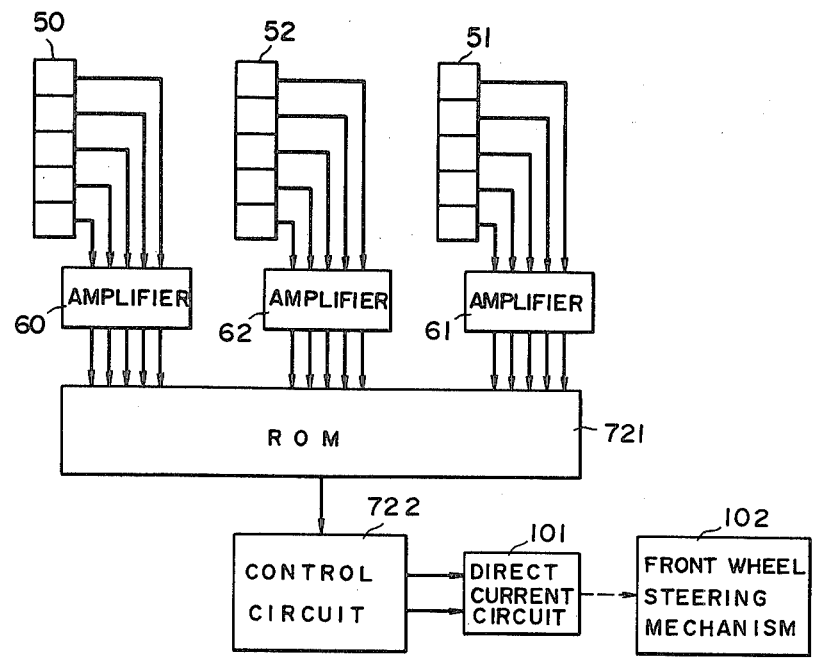
FIG. 15 is a block diagram of a steering signal generating apparatus comprising detecting means provided in front, center and rear portions of an automobile as shown in FIG. 14.

FIG. 14 is a view showing an arrangement of detecting means in accordance with still a further embodiment of the present invention. FIG. 15 is a block diagram of a path indicating apparatus for the FIG. 14 detecting means. The embodiment shown in FIGS. 14 and 15 comprises a detecting means 52 at the central portion of the automobile 10 in addition to the detecting means 50 and 51 provided at the front and rear portions of the automobile 10, so that the automobile 10 may be moved more accurately along the path. More specifically, with the previously described FIG. 12 embodiment, the automobile 10 is not steered leftward nor rightward upon detection of the laser beam by the front portion detector 503 and the rear portion detector 513. However, as shown in FIG. 14, considering a case where the path is a curve of a relatively small radius of curvature, the automobile 10 could deviate from the path unless the same is steered leftward, even if the detectors 503 and 513 had been detecting the laser beam 40. Therefore, in order to eliminate such situation, the embodiment shown in FIGS. 14 and 15 further comprises a detecting means 52 disposed between the front portion detecting means 50 and the rear portion detecting means 51. The detecting means 52 also comprises five detectors 521 to 525 as similar to the previously described detecting means 50 and 51. The detected output signals of the detectors 521 to 525 are applied to the amplifier 62 to be amplified. The output signal from the amplifier 62 is also applied to the read-only memory 721 as an address signal. The read-only memory 721 stores the weighted data corresponding to the respective detected signals of the detecting means 50, 51 and 52, as similar to the previously described FIG. 13 embodiment. The read-only memory 721 is thus responsive to the respective detected signals from the detecting means 50, 51 and 52 to provide the correspondingly weighted data to the control circuit 722. The control circuit 722 is responsive to the applied weighted data to provide the direct current voltage of the corresponding polarity and magnitude to the direct current motor 101.

Thus, according to the embodiment in discussion the automobile 10 can move along the path with an extreme accuracy even in the case where the path is defined by the scanning laser beam 40 as a curve of a relatively small radius of curvature.

Figure 16A:
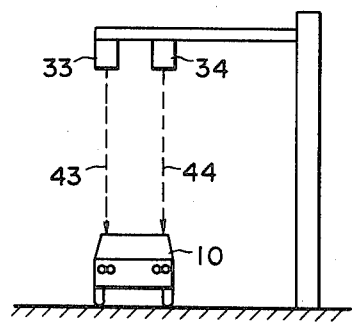
FIGS. 16A and 16B are views for showing a laser beam generating apparatus for scanning two laser beams.
Figure 16B:
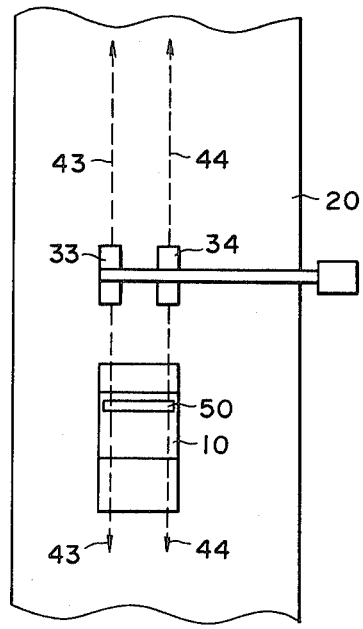

FIGS. 16A and 16B are views showing another embodiment of the laser beam generating apparatus, in which FIG. 16A is a front view of the same and FIG. 16B is a plan view of the same. FIGS. 16A and 16B show an embodiment in which two laser beam generating apparatuses 33 and 34 are provided with a predetermined spacing therebetween at a position above the road 20 for scanning laser beams 43 and 44 of different frequencies f1 and f2 in parallel with each other and with a given spacing therebetween. The center of the two lines defined by the two scanning laser beams 33 and 34 is defined as a path along which the automobile 10 is to move. The laser beam generating apparatuses 33 and 34 may be structured in a manner similar to that shown in FIG. 2A.

FIGS. 17A, 17B and 17C are block diagrams of a steering signal generating apparatus for detecting the laser beams 43 and 44 generated from the laser beam generating apparatuses 33 and 34 shown in FIGS. 16A and 16B. First referring to FIG. 17A, the detectors 53 and 54 for individually detecting the respective laser beams 43 and 44 of the different frequencies are disposed in parallel with the direction orthogonal to the moving direction of the automobile 10. The detectors 53 and 54 comprise solar batteries or the like and the detector 53 is adapted to detect only the laser beam 43 of the frequency f1 and the detector 54 is adapted to detect only the laser beam 44 of the frequency f2. The lengths of the respective detectors 53 and 54 are selected to be longer than the spacing between the laser beams 43 and 44. The detected signals of the respective detectors 53 and 54 are applied to the amplifier 601 and 602 to be amplified thereby. The amplifiers 601 and 602, the determining circuit 701, the direct current motor 101 and the front wheel steering mechanism 102 are structured in the same manner as described in conjunction with FIG. 10.

Now an operation of the embodiment shown will be described. When the automobile 10 is moving accurately along the path, the detector 53 detects the laser beam 43 of the frequency f1 and the detector 54 detects the laser beam 44 of the frequency f2. The detected signals from the detectors 53 and 54 are amplified by the amplifiers 601 and 602, respectively, and the determining circuit 701 is responsive to the amplified outputs from the amplifiers 601 and 602, when no direct current voltage is applied to the direct current motor 101.

However, when the automobile 10 deviates rightward off the path, as shown in FIG. 17B, the detector 53 detects the laser beam 43 of the frequency f1 while the other detector 54 comes not to detect the laser beam of the frequency f2.

The detected signal from the detector 53 is applied through the amplifier 601 to the determining cicuit 701, while the detected output signal from the detector 54 is not applied to the determining circuit 701. As a result, the determining circuit 701 selects the polarity, for example, negative polarity, of the direct current voltage applying the direct current voltage to the direct current motor 101. Then, the front wheel steering mechanism 102 steers the front wheels of the automobile 10 leftward in response to the rotation of the direct current motor 101. Conversely, when the automobile 10 deviates leftward off the path, as shown in FIG. 17C, the detector 53 does not detect the laser beam 43 of the frequency f1. However, the detector 54 detects the laser beam 44 of the frequency f2. The detected signal from the detector 54 is applied through the amplifier 602 to the determining circuit 101. Then, the direct current motor 101 is rotated in the opposite direction and the front wheel steering mechanism 102 steers the front wheels of the automobile 10 rightward.

Thus, according to the above described embodiment as well, the two laser beams 43 and 44 of the different frequencies are separately detected to steer the automobile 10 so that the same runs along the path.

The embodiment shown in FIGS. 17A, 17B and 17C may also comprise detecting means at both the front and rear portions of the automobile 10 as in the case of the FIG. 12 embodiment and furthermore the same may comprise a further detecting means at the central portion of the automobile 10 as in the case of FIG. 14 embodiment.

As described previously, the embodiment shown in FIGS. 17A, 17B and 17C was adapted such that the two laser beams 43 and 44 of the different frequencies f1 and f2, respectively, may be scanned in parallel with a predetermined spacing therebetween. However, alternatively two laser beams of the same frequency may be scanned with a predetermined spacing therebetween. To that end, the laser beam generated by the previously described laser beam generating portions 301 is split into two laser beams by means of a prism, for example, whereupon the two laser beams may be reflected by two reflecting mirrors for the purpose of scanning. The detecting means may be provided such that a plurality of detectors 501 to 505 as shown in FIG. 11 are disposed in the direction orthogonal to the moving direction of the automobile 10.

In the foregoing, the embodiment was described as employing the laser beams 43 and 44 of different frequencies. However, the present invention is not limited thereto and may be embodied such that two laser beams of the same frequency are generated and the respective laser beams are modulated with different identifying information, whereupon these two modulated laser beams are scanned in parallel with the path. A demodulating circuit is provided between the amplifiers 601 and 602 and the determining circuit 700 of the moving vehicle and the above described identifying information is demodulated by the demodulating circuit and the demodulated output is applied to the determining circuit 700.

Figure 18A:
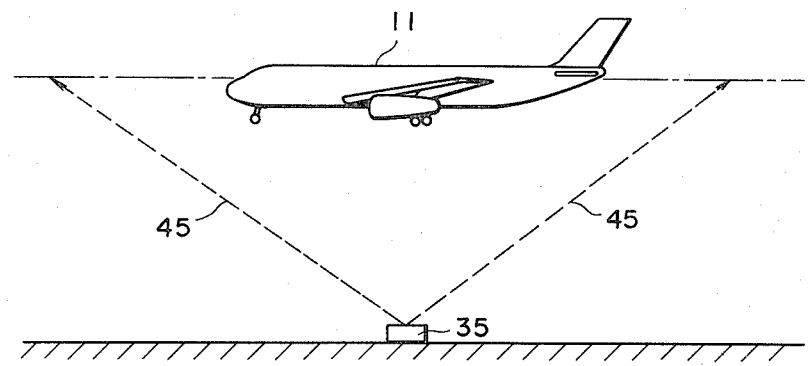
FIGS. 18A and 18B are views showing laser beams scanned along the moving path of an aircraft.
Figure 18B:
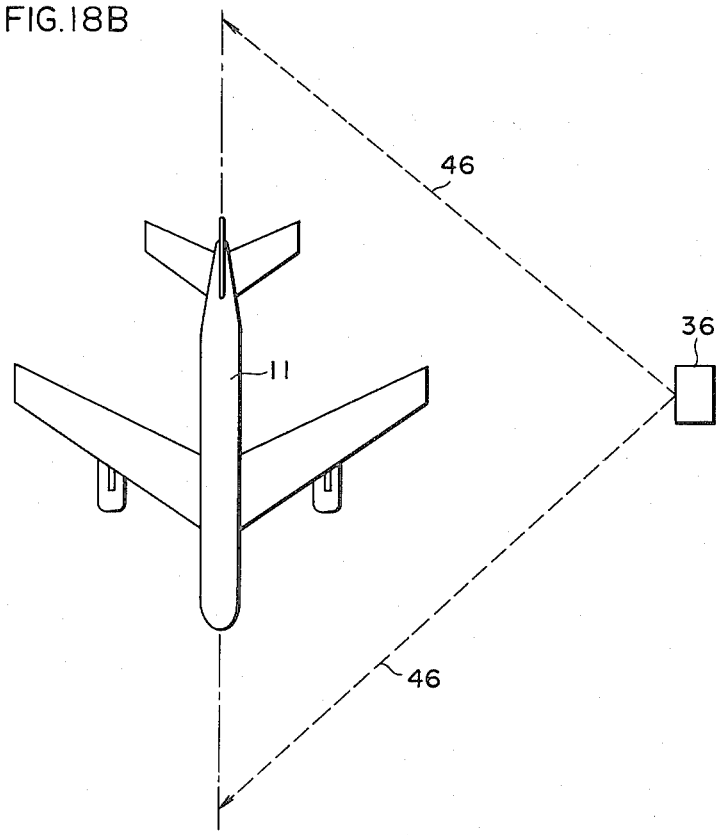
Figure 19:
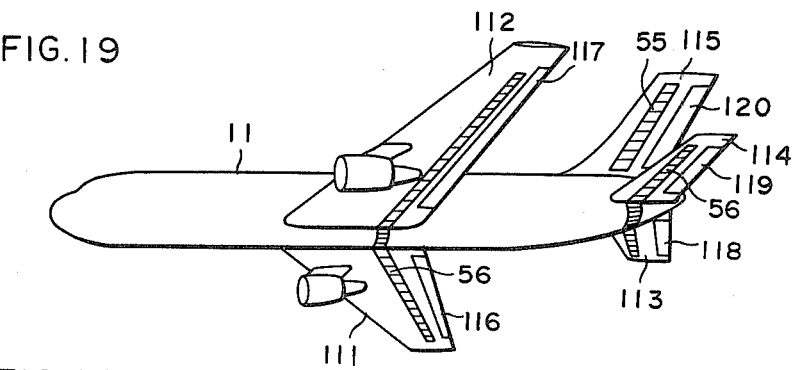
FIG. 19 is a perspective view of an aircraft taken by way of one example of a moving vehicle.
Figure 20:
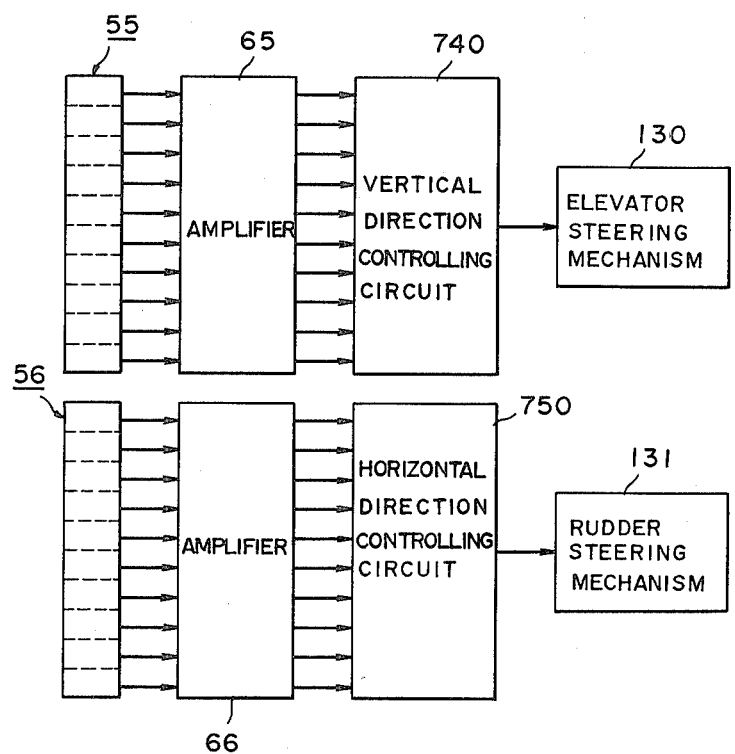
FIG. 20 is a block diagram of a steering signal generating apparatus borne on an aircraft.

FIGS. 18A and 18B are views showing an example in which a laser beam is scanned along a moving path of an aircraft. FIG. 19 is a perspective view of an aircraft which is an example of a moving vehicle in accordance with the embodiment of the invention. FIG. 20 is a block diagram of a path indicating apparatus borne on an aircraft.

The embodiment shown in FIGS. 18A, 18B, 19 and 20 is adapted to scan laser beams both along a first plane of a horizontal plane, for example, and a second plane of a vertical plane, for example, so that scanning planes may be formed, and to assist an aircraft 11 in flying along the path defined as an intersecting line of the first plane or the horizontal plane and the second plane or the vertical plane. More specifically, as shown in FIG. 18A, a first laser beam generating apparatus 35 is provided on the ground. The laser beam generating apparatus 35 is adapted to scan the laser beam 45 upward from the ground, whereby a first scanning plane is formed a vertical plane.

On the other hand, as shown in FIG. 18B, a second laser beam generating apparatus 36 is provided for the purpose of forming a second scanning plane as a horizontal plane. The laser beam generating apparatus 36 is adapted to scan in succession the laser beam 46 in the horizontal direction.

As shown in FIG. 19, the aircraft 11 comprises wings 111 and 112 and horizontal tail planes 113 and 114 serving as a horizontal plane and a vertical tail plane 115 serving as a vertical plane. The wings 111 and 112 are provided with flaps 116 and 117, the horizontal tail planes 113 and 114 are provided with elevators 118 and 119, and the vertical tail plane 115 is provided with a rudder 120. A detector 56 is provided on the lower surface of the wings 111 and 112 for detecting the laser beam 45 being scanned in the vertical direction. Alternatively, the detector 56 may be provided on the lower surface of the horizontal tail planes 113 and 114 or on the lower surface of the wings 111 and 112. Detectors 55 are also provided on both side surfaces of the vertical tail plane 115 for the purpose of detecting the laser beam 46 being scanned in the horizontal direction.

Now referring to FIG. 20, the detected signal of the detectors 55 provided on the vertical tail plane 115 is applied to the amplifier 65 to be amplified thereby. The output signal from the amplifier 65 is applied to a vertical direction controlling circuit 740. The vertical direction controlling circuit 740 is responsive to the detected signal from the detector 55 to determine a vertical deviation of the aircraft 11 with respect to the path. The vertical direction controlling circuit 740 controls an elevator steering mechanism 130 based on the determination. The detected signal of the detector 56 disposed on the horizontal surface is applied to the amplifier 66 to be amplified thereby. The output signal from the amplifier 66 is applied to a horizontal direction controlling circuit 750. The horizontal direction controlling circuit 750 determines a deviation leftward or rightward of the aircraft 11 with respect to the path based on the detected signal of the laser beam 45 being scanned in the vertical direction. The horizontal direction controlling circuit 750 controls a rudder steering mechanism 131 based on the determination.

Now an operation of the embodiment will be described. The detectors 55 provided on the vertical tail plane 115 detect the laser beam 46 being scanned in the horizontal direction. The detected signal from the detector 55 is amplified by the amplifier 65 and the amplified output is applied to the vertical direction controlling circuit 740. The vertical direction controlling circuit 740 is responsive to the output signal from the amplifier 65 to determine a positional deviation of the aircraft 11 away from the path to control the elevator steering mechanism 130 to raise the aircraft 11, if the aircraft 11 has deviated downward from the path 11, or to control the elevator steering mechanism 130 to lower the aircraft 11, if the aircraft has risen upward from the path. The detector 56 provided on the wings 111 and 112 detects the laser beam 45 being scanned in the vertical direction. If and when the laser beam 45 has been detected approximately at the center of the aircraft 11, the horizontal direction controlling circuit 750 does not control the rudder steering mechanism 131. However, if the detector 56 on the left side wing 112 has been detecting the laser beam 45, the horizontal direction controlling circuit 750 controls the rudder steering mechanism 131 so as to steer the rudder 120 rightward. Conversely, if the detector 56 on the right side wing 111 has been detecting the laser beam 45, the horizontal direction controlling circuit 750 controls the rudder steering mechanism 131 so as to steer the rudder 120 leftward.

According to the above described embodiment, a flying vehicle such as the aircraft 11 can be steered not only in the horizontal direction but also in the vertical direction.

Although the embodiment shown in FIGS. 18A to 20 was adapted to control the horizontal and vertical directional steering of the aircraft, the present invention may be embodied to control only the horizontal or vertical directional steering. A flying vehicle may be of any other types, such as a missile, helicopter or the like.

In the above described embodiment the laser beams 45 and 46 were scanned on the vertical and horizontal planes. Alternatively, however, both beams 45 and 46 may be selected to be of different frequencies and may be scanned upward obliquely so that both scanning planes may intersect each other. In the case of such a modification, the aircraft 11 may be provided on both sides surface of the vertical tail plane 115, for example, with two sets of detectors arranged in parallel for detecting two laser beams 45 and 46 of different frequencies, respectively.

Meanwhile, the laser beams 45 and 46 may be modulated with identifying information for identifying the respective laser beams.

Figure 21:
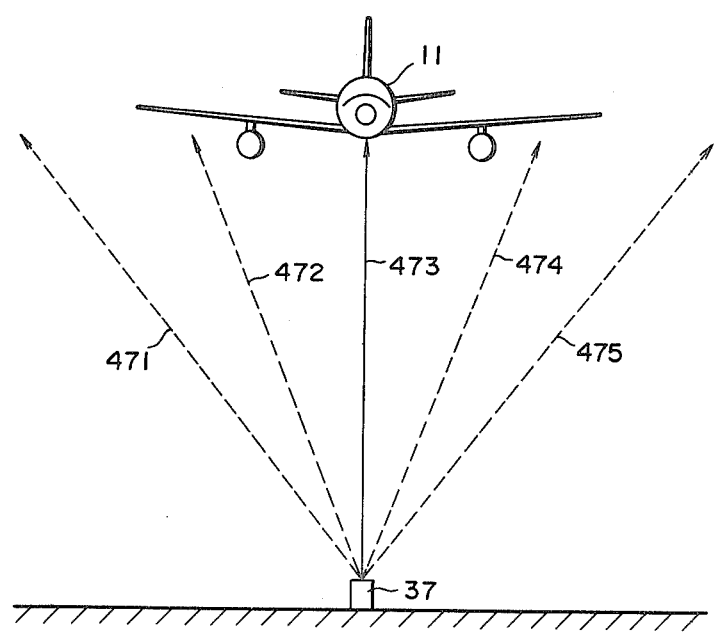
FIG. 21 is a view showing another embodiment of the laser beam generating apparatus for scanning a laser beam along the path of the aircraft 11.

FIG. 21 is a view showing another embodiment of the laser beam generating apparatus for scanning a laser beam along the path of the aircraft 11. The FIG. 21 embodiment is adapted to scan a plurality of laser beams of different frequencies upward from the ground. More specifically, the wings 111 and 112 are provided with the detector 56, as shown in FIG. 19; however, if the position of the aircraft 11 considerably deviates from the path defined by the scanning laser beam 45, the detector 56 does not detect the laser beam 47 any more. By providing the laser beam generating apparatus 37 so as to generate a plurality of laser beams 471 to 475 of different frequencies from the ground so that the laser beams may be scanned in parallel, in consideration of the above described case, any of the laser beams is detected by the detector even if the aircraft deviates from the path. Then means is provided for determining the degree of deviation of the aircraft from the path by detecting the frequency of the detected laser beam.

Meanwhile, the respective laser beams 471 to 475 may be modulated with identifying information capable of identifying the respective laser beams, in which case the respective laser beams may be of the same frequency.

Figure 22A:
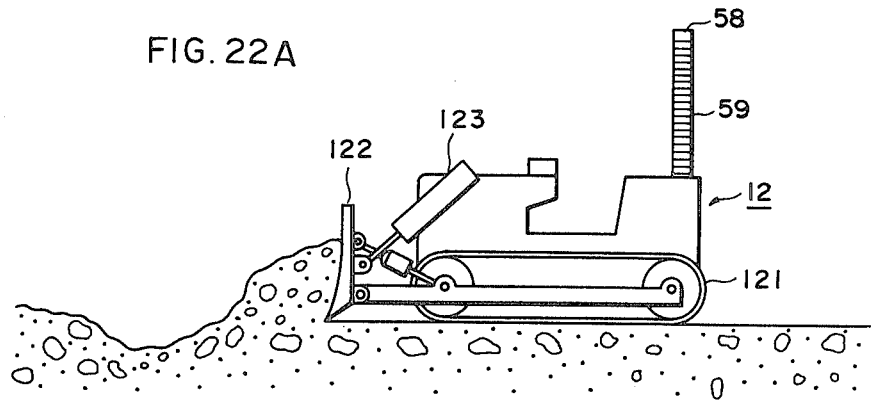
FIGS. 22A, 22B and 22C are views showing another embodiment in which the present invention is employed in a bulldozer taken by way of another example of a moving vehicle.
Figure 22B:
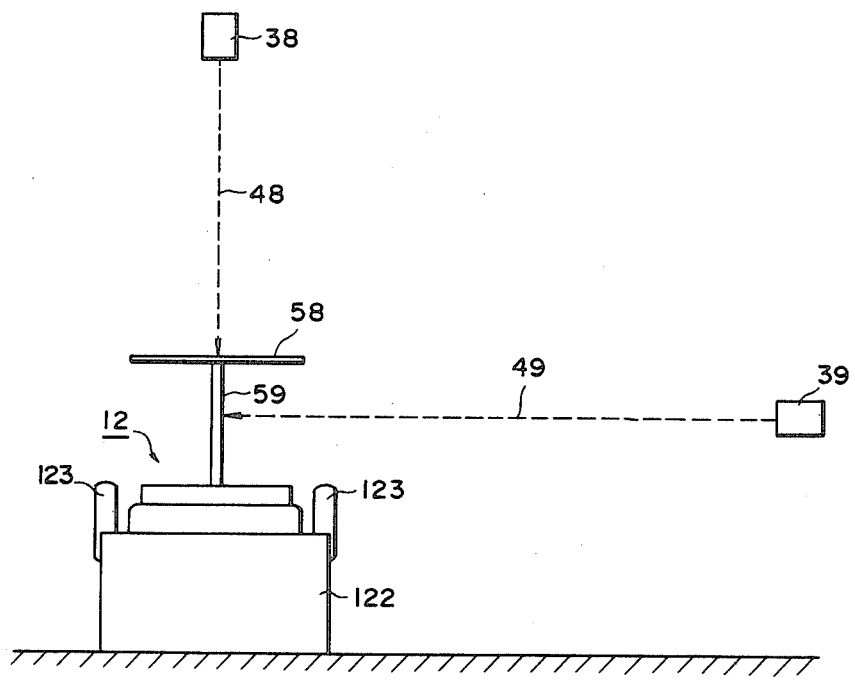
Figure 22C:
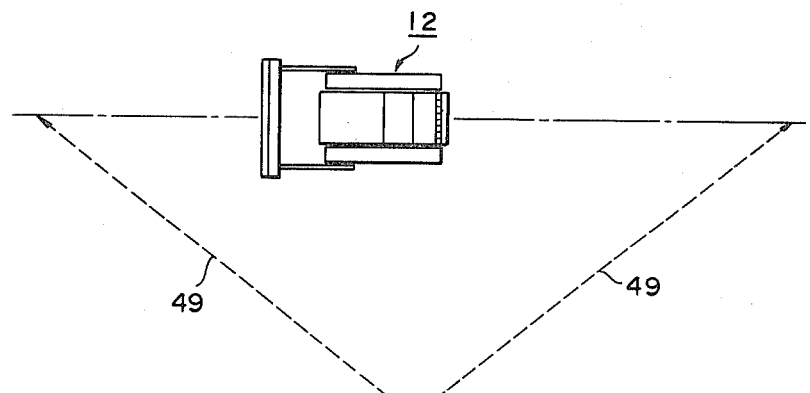

FIGS. 22A, 22B and 22C are views of an example of a case where the present invention is embodied in a bulldozer as another example of the a moving vehicle. The embodiment can be advantageously utilized in grading a road, for example, by means of a bulldozer 12. Referring to FIG. 22A, the bulldozer 12 comprises caterpillars 121 and a blade 122 which is provided to be movable or adjustable in the vertical position. The caterpillars 121 are used for movement on the ground and for change of the moving direction in the horizontal plane. On the other hand, the blade 122 is for removing earth and sand and is coupled to an oil pressure cylinder 123 serving as a blade control means for controlling a steering angle in the vertical direction of the blade 122. The detectors 58 and 59 are provided at the rear portion of the bulldozer 12. The detector 58 is aimed to detect the laser beam 48 scanned in the vertical direction from the laser beam generating apparatus 38. On the other hand, the detector 59 is aimed to detect the laser beam 49 scanned in the horizontal direction from the laser beam generating apparatus 39.

Figure 23:
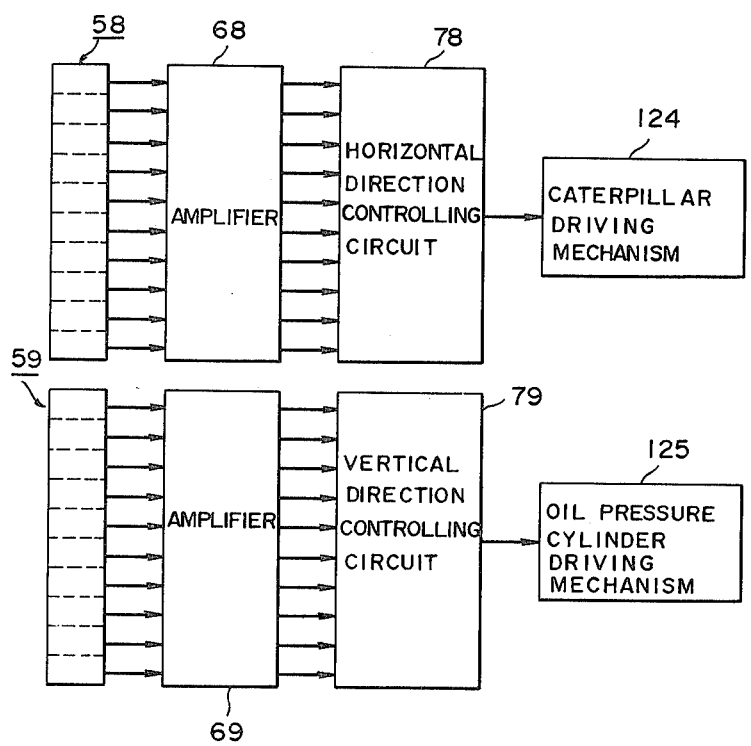
FIG. 23 is a block diagram of a path indicating apparatus borne on a bulldozer.

FIG. 23 is a block diagram of a path indicating apparatus borne on the bulldozer 12. The detected signal of the detector 58 is amplified by the amplifier 68 and the amplified output is applied to the horizontal direction controlling circuit 78. The horizontal direction controlling circuit 78 is responsive to the detected signal of the detector 58 to control a caterpillar driving mechanism 124. The caterpillar driving mechanism 124 is aimed to control the rotation of the left and right caterpillars 121. The detected signal of the detector 59 is amplified by the amplifier 69 and the amplified output is applied to the vertical direction controlling circuit 79. The vertical direction controlling circuit 79 is responsive to the detected signal of the detector 58 to control the oil pressure cylinder driving mechanism 125. The oil pressure cylinder driving mechanism 125 serves to drive the oil pressure cylinder 123, thereby to control the rotational angle of the blade 122 in the vertical direction.

Now an operation of the embodiment will be described. When the central detector of the detector 58 arranged in the horizontal direction detects the laser beam 48, the horizontal direction controlling circuit 78 does not control the caterpillar driving mechanism 124. However, when the left or right detector out of the detector 58 detects the laser beam 48, the horizontal direction controlling circuit 78 controls the caterpillar driving mechanism 124. More specifically, when the right side detector detects the laser beam 48, the horizontal direction controlling circuit 78 causes the caterpillar driving mechanism 124 to stop the rotation of the right side caterpillar and to rotate the left side caterpillar, thereby to steer the bulldozer 12 rightward. Conversely, when the left side detector detects the laser beam 48, the horizontal direction controlling circuit 78 control the caterpillar driving mechanism 124, thereby to steer the bulldozer 12 leftward. On the other hand, when the central detector out of the detectors 59 disposed in the vertical direction detects the laser beam 49, the vertical direction controlling circuit 79 controls the oil pressure cylinder driving mechanism 125, thereby to maintain the angle of the blade 122 in the vertical direction in a given angle. However, when an upper detector out of the detectors 59 detects the laser beam 49, the vertical direction controlling circuit 79 determines that the blade 122 has been too much adjusted downward and the oil pressure cylinder 123 is driven to control the angle of the blade 122 to be slightly upward. Conversely, when a lower detector out of the detectors 59 detects the laser beam 49, the vertical direction controlling circuit 79 controls the angle of the blade 122 so as to be slightly downward.

According to the embodiment shown, in grading a road, for example, by scanning the laser beams 48 and 49 along a road surface being graded, the road can be graded with extreme accuracy along a predetermined path and with a predetermined height. Since the embodiment has been adapted such that the laser beams 48 and 49 are scanned on the vertical plane and the horizontal plane, a plurality of bulldozers can be done in grading a road along a predetermined path without any interference among the bulldozers in detection of the laser beams 48 and 49.

The above described embodiment was structured such that the detectors 58 and 59 are provided at the rear portion of the bulldozer 12. However, the detectors 58 and 59 may also be provided at the front portion of the bulldozer 58. In such a case, the embodiment may be further adapted such that determination is made of a deviation of the bulldozer 12 leftward or rightward and upward or downward off the path in response to the detected signals of the detectors at the front portion and the rear portion of the bulldozer 12.

In the foregoing the embodiment was described by referring to an example in which the present invention is embodied in a bulldozer; however, the moving vehicle is not limited to a bulldozer and may be of any other type such as a crane carriage, or terrain vehicles in the crane case a steering angle of an arm of the crane may be controlled in response to a laser beam being scanned.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A path indicating apparatus for indicating to a moving vehicle having a moving direction and a movement path in association with an intersecting line defined by a first plane and a second plane intersecting said first plane, comprising:

signal generating means provided at a predetermined fixed location spaced apart from said movement path in a direction intersecting said movement path for generating a signal having a narrow beam width;

scanning means provided at a predetermined fixed location spaced apart from said movement path in a direction intersecting said movement path for providing a scanning signal in response to said signal generated by said signal generating means and for forming a scanning plane corresponding to at least one of said first and second planes;

scanning signal detecting means including a plurality of elements each independently detecting said scanning signal from said scanning means, extending a predetermined length in a direction intersecting the moving direction of said moving vehicle and said scanning plane, each of said plurality of elements providing a detection signal upon detection of said scanning signal;

deviation determining means provided on said moving vehicle responsive to said detection signal from said scanning signal detecting means for determining a deviation of said moving vehicle with respect to said intersecting line and providing a determination signal; and direction indicating means provided on said moving vehicle responsive to said determination signal from said deviation determining means for indicating a direction in which said moving vehicle is to be moved.

2. A path indicating apparatus for a moving vehicle in accordance with claim 1, wherein:

said deviation determining means comprises means for providing a relatively highly weighted determination signal in response to the detection signal from elements of both ends of a plurality of elements included in said scanning signal detecting means and for providing relatively less weighted determination signal in response to the detection signal from a central element of said plurality of elements.

3. A path indicating apparatus in accordance with claim 1, wherein said signal generating means comprises means for generating one signal having a narrow beam width, said scanning means is responsive to said one signal having a narrow beam width for providing a scanning signal to form a scanning plane corresponding to at least one of said first and second planes, and said plurality of elements included in said scanning signal detecting means are arranged in succession in the direction intersecting the moving direction of said moving vehicle and said scanning plane.

4. A path indicating apparatus of a moving vehicle in accordance with claim 1, wherein the signal having a narrow beam width comprises a signal including information in terms of a frequency component, said signal generating means comprises means for generating a plurality of signals of the same frequencies, said scanning means is responsive to said plurality of signals for providing a plurality of scanning signals, thereby to form a plurality of scanning planes in parallel with said at least one of said first and second planes, and said plurality of elements included in said scanning signal detecting means are adapted to individually detect said plurality of signals of the same frequency being scanned, respectively, and are disposed in succession in the direction intersecting the moving direction of said moving vehicle and said plurality of parallel scanning planes.

5. A path indicating apparatus of a moving vehicle in accordance with claim 1, wherein said signal having a narrow beam width comprises a signal including information in terms of a frequency component, said signal generating means comprises means for generating a plurality of signals of different frequencies, said scanning menas is responsive to said plurality of signals of different frequencies, thereby to form a plurality of scanning planes in parallel with said at least one of said first and second planes, and said plurality of elements included in said scanning signal detecting means are disposed to be capable of detecting said plurality of signals of different frequencies being scanned, respectively.

6. A path indicating apparatus of a moving vehicle in accordance with claim 1, wherein said moving vehicle is adapted to move on a selected fixed plane, said first plane is formed as said scanning plane, said second plane is formed in association with said fixed plane, said scanning signal detecting means comprises first detecting means for detecting said scanning signal and providing a first detection signal, upon detection of said scanning signal, and said deviation determining means comprises means responsive to said first detection signal from said first detecting means and information concerning said fixed plane for determining a deviation of said moving vehicle with respect to said intersecting line.

7. A path indicating apparatus of a moving vehicle in accordance with claim 1, wherein said moving vehicle is adapted to be movable in the direction of said first plane and in the direction of said second plane, said signal generating means comprises means for generating first and second signals having a narrow beam width, said scanning means comprises first scanning means responsive to said first signal for providing a first scanning signal to form a first scanning plane corresponding to said first plane, and second scanning means responsive to said second signal for providing a second scanning signal to form a second scanning plane corresponding to said second plane, and said scanning signal detecting means comprises first detecting means for detecting said first scanning signal and providing a first detection signal upon detection of said first scanning signal, and second detecting means for detecting said second scanning signal and providing a second detection signal upon detection of said second scanning signal, and said deviation determining means comprises means responsive to said first detection signal from said first detecting means and to said second detection signal from said second detecting means for determining a deviation of said moving vehicle with respect to said intersecting line.

8. A path indicating apparatus of a moving vehicle in accordance with claim 7, wherein said moving vehicle comprises an aircraft comprising a horizontal wing and a vertical wing, and said aircraft comprises
horizontal wing control means responsive to said determination signal from said deviation determining means for controlling said horizontal wing, and
vertical wing control means responsive to said determination signal from said deviation determining means for controlling said vertical wing.

9. A path indicating apparatus of a moving vehicle in accordance with claim 7, wherien
said moving vehicle comprising a movable member movable along said first plane, and which further comprises
movable member control means responsive to said determination signal from said deviation determining means for controlling said movable member.

10. A path indicating apparatus of a moving vehicle in accordance with claim 9, wherein
said moving vehicle comprises steering means for controlling the moving direction of said moving vehicle in the second plane.

11. A path indicating apparatus of a moving vehicle in accordance with claim 1, which further comprises
display means responsive to said determination signal from said deviation determining means for indicating direction indicating information for moving said moving vehicle with a decreased deviation with respect to said movement path.

12. A path indicating apparatus of a moving vehicle in accordance with claim 1, which further comprises
sound producing means responsive to said determination signal from said deviation determining means for producing a sound representing direction indicating information for moving said moving vehicle with a decreased deviation with respect to said movement path.

13. A path indicating apparatus of a moving vehicle in accordance with claim 1, wherein
said signal generating means comprises means for generating a light signal having a narrow beam width.

14. A path indicating apparatus of a moving vehicle in accordance with claim 13, wherein
said light signal generating means comprises means for generating a laser beam.

15. A path indicating apparatus of a moving vehicle in accordance with claim 1, wherein
said signal generating means comprises means for generating an ultrasonic signal having a narrow beam width.

16. A path indicating apparatus of a moving vehicle in accordance with claim 1, wherein
said signal generating means comprises means for generating a laser beam with modulated signal.

17. A path indicating apparatus for a moving vehicle for indicating a moving path in association with an intersecting line defined by a first plane and a second plane intersecting said first plane, comprising:
signal generating means provided at a predetermined fixed location spaced apart from said movement path in a direction intersecting said movement path for generating a signal having a narrow beam width;
scanning means provided at a predetermined fixed location spaced apart from said movement path in said direction intersecting said movement path for providing a scanning signal in response to said signal generated by said signal generating means and for forming a scanning plane corresponding to at least one of said first and second planes;
scanning signal detecting means including a plurality of elements each independently detecting the scanning signal from said scanning means extending a predetermined length in a direction intersecting the moving direction of said moving vehicle and said scanning plane, each of said plurality of elements providing a detection signal, upon detection of said scanning signal;
deviation determining means provided on said moving vehicle and responsive to said detection signal from said scanning signal detecting means for determining a deviation of said moving vehicle with respect to said intersecting line and providing a determination signal; and
steering means provided on said moving vehicle responsive to said determination signal from said deviation determining means for steering said moving vehicles so as to decrease a deviation with respect to said movement path.

* * * * *